(12) United States Patent
He et al.

(10) Patent No.: US 6,545,805 B2
(45) Date of Patent: Apr. 8, 2003

(54) POLARIZATION-DEPENDENT RETROREFLECTION MIRROR DEVICE

(75) Inventors: Xue Dong He, Cupertino, CA (US); Robert R. McLeod, Morgan Hill, CA (US); Hong-Wei Mao, San Jose, CA (US); Qingdong Guo, Sunnyvale, CA (US); Kuochou Tai, Fremont, CA (US); Kok-Wai Chang, Los Altos, CA (US)

(73) Assignee: JDS Uniphase Corp., San Jose, CA (US)

( * ) Notice: Subject to any disclaimer, the term of this patent is extended or adjusted under 35 U.S.C. 154(b) by 2 days.

(21) Appl. No.: 09/855,569

(22) Filed: May 16, 2001

(65) Prior Publication Data

US 2002/0171933 A1 Nov. 21, 2002

(51) Int. Cl.[7] .................................................. G02B 5/30
(52) U.S. Cl. ........................ 359/497; 359/237; 359/238; 359/239; 359/279; 359/495; 359/496
(58) Field of Search ........................ 359/279, 495–497, 359/237–239; 369/112; 385/2

(56) References Cited

U.S. PATENT DOCUMENTS 5,694,385 A * 12/1997 Takahashi et al. .......... 369/112

6,169,626 B1 * 1/2001 Chen et al. ................. 359/279

* cited by examiner

Primary Examiner—Audrey Chang
Assistant Examiner—Craig Curtis
(74) Attorney, Agent, or Firm—Hall, Priddy, Myers & Vande Sande

(57) ABSTRACT

Conventional retroreflection mirrors in the form of right angle prisms are quite sensitive to beam position and beam angle errors. Manufacturing and assembly tolerances are also a cause of concern in conventional devices. Accordingly, the present invention solves these aforementioned problems by providing a retroreflection device comprising: a beam director, preferably in the form of a Wollaston prism; a polarization rotator, preferably in the form of a quarter wave plate; and a flat reflective surface, such as a plane mirror. The device of the present invention is far less sensitive to beam angle alignment and is completely independent of the beam position. The present invention is particularly useful as a beam splitter for directing orthogonally polarized beams of light back along parallel paths in an interleaver apparatus.

20 Claims, 9 Drawing Sheets

$\beta \cong 3\alpha$

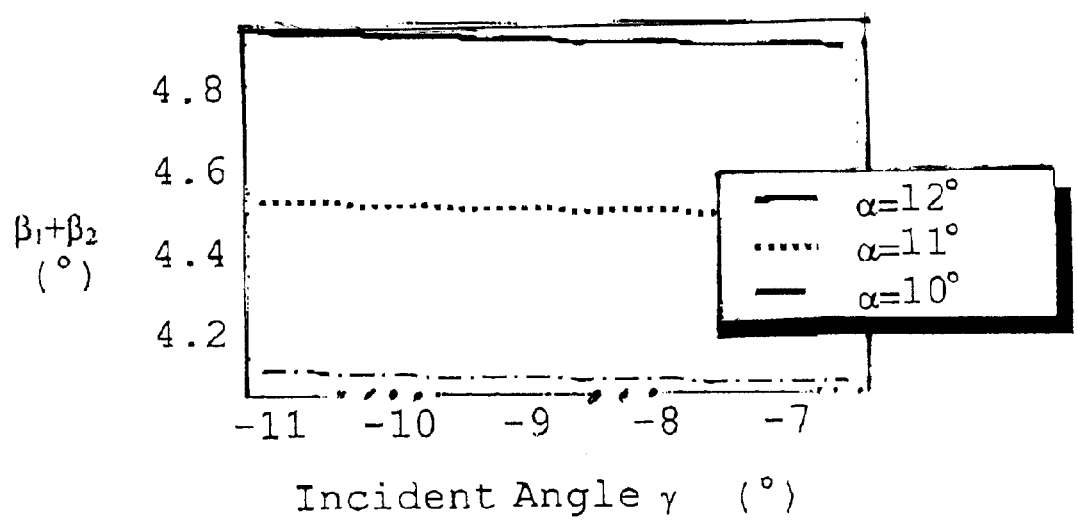
Figure 6a - YVO$_4$
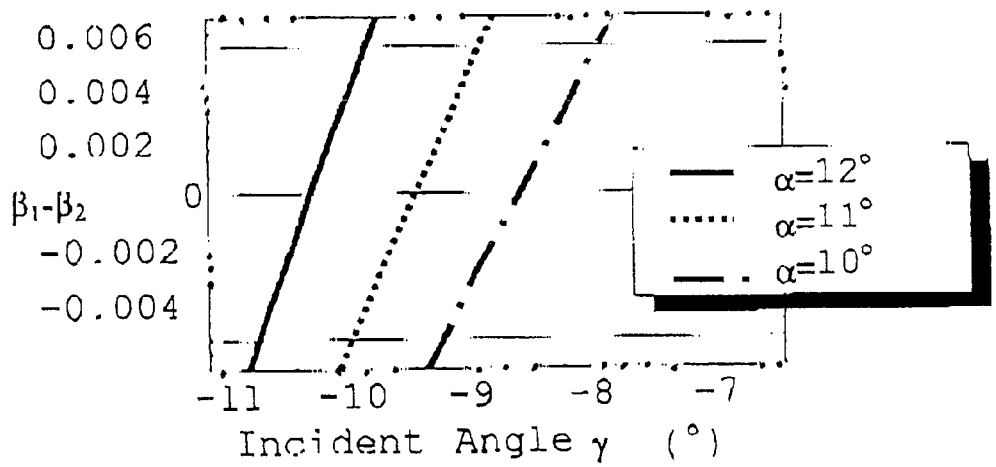
Figure 6b - YVO$_4$

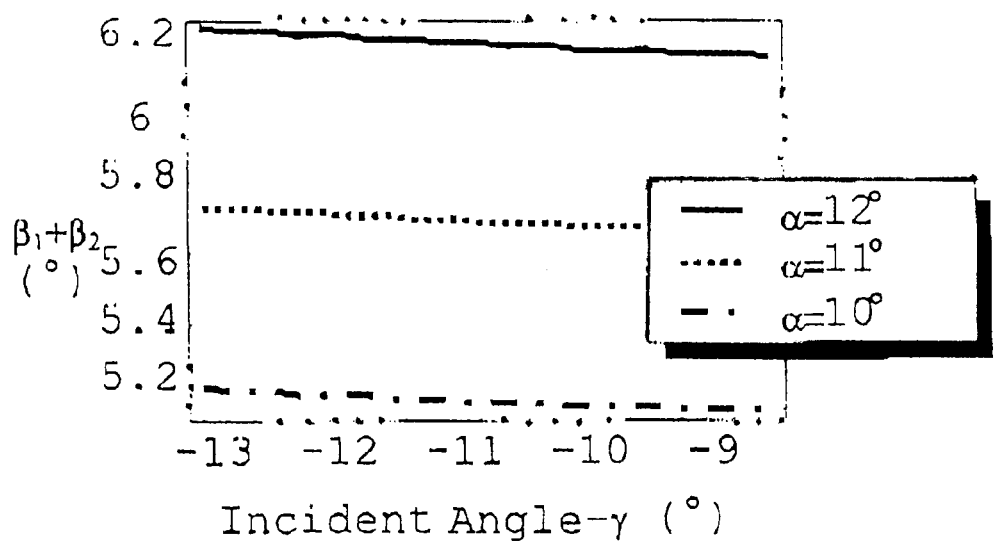
Figure 7a - Rutile (TiO$_2$)
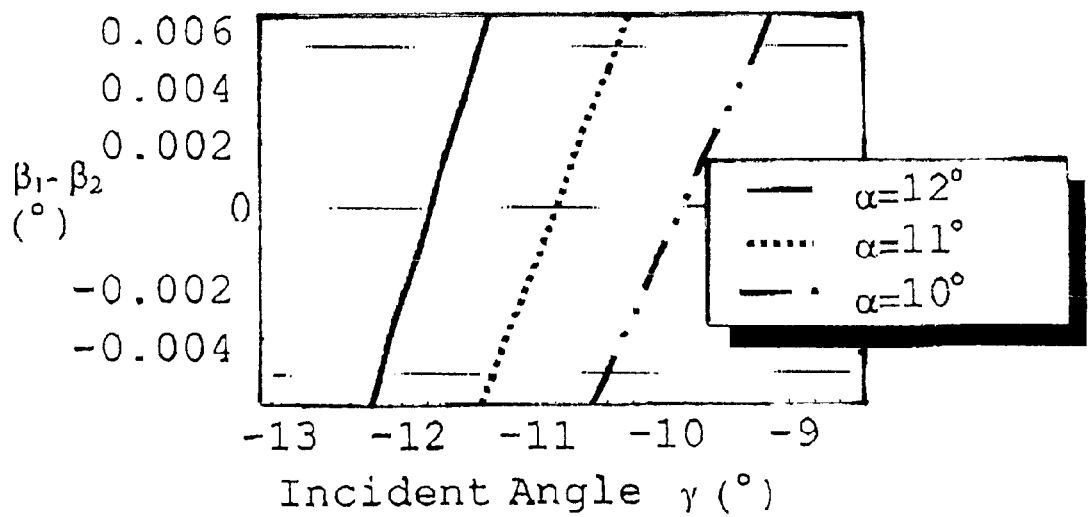
Figure 7b - Rutile (TiO$_2$)

POLARIZATION-DEPENDENT RETROREFLECTION MIRROR DEVICE

FIELD OF THE INVENTION

The present invention relates to a retroreflection mirror device, and in particular to a polarization-dependent retroreflection mirror device using a pair of birefringent wedges to direct beams of light, preferably for use in an optical channel interleaver device.

BACKGROUND OF THE INVENTION

Retroreflection mirrors are used in optics to reflect an optical beam back along a path parallel to the incident beam, with a desired offset therefrom. Conventional devices use Right Angle Prisms, either alone or in various combinations thereof for retroreflection. Right Angle Prisms reflect light independent of the polarization thereof. Moreover, the reflection direction is independent to the angle at which the beam is incident upon the mirror. Unfortunately, the offset of the reflected beam is very sensitive to the position of the incident beam relative to the prism. FIG. 1 illustrates how, if the prism is offset by a distance y from a desired position thereof, the reflected beam will be displaced by a distance 2y from its desired location. Similarly, with reference to FIG. 2, if the incident beam is offset by a distance y from the ideal position thereof, the reflected beam will also be displaced by a distance y from its desired location.

Other potential errors in Right Angle Prisms result from structural errors inherent in the prisms themselves. Inaccuracies in the right angle and the pyramidal angle result in errors that are three times larger than the original error (see FIGS. 3a and 3b). In the fiber optic communication industry, in which very small components requiring precise optical alignment are packed into minimally sized packages, it is advantageous to have devices that are much less sensitive to minor misalignments.

It is an object of the present invention to overcome the shortcomings of the prior art by providing a retroreflection mirror that is relatively much less sensitive to incident beam angle and position.

SUMMARY OF THE INVENTION

Accordingly the present invention relates to a retroreflection mirror device comprising:
  beam-directing means including a first wedge having a first optical axis, and a second wedge having a second optical axis that is perpendicular to the first optical axis, the beam directing means for receiving a first optical signal having a first polarization along a first incident axis, and for directing the first optical signal outwardly therefrom at a first angle from a first launch axis, the first launch axis being parallel to the incident axis;
  polarization rotating means for effectively rotating the polarization of the first optical signal by 90°; and
  a reflector for directing the first optical signal back through the beam-directing means;
  whereby after passing through the beam-directing means a second time the first optical signal exits the beam-directing means along a first output axis substantially parallel to the first incident axis.

Another aspect of the present invention relates to a deinterleaver apparatus comprising:
  a first port for inputting a first polarized optical signal, which comprises a second optical signal with a first subset of channels and a third optical signal with a second subset of channels;
  a second port for outputting the second optical signal;
  a third port for outputting the third optical signal;
  a birefringent assembly optically coupled to the first, second and third ports, whereby, after the first optical signal makes a first pass through the birefringent assembly along a first path, the second optical signal exits the birefringent assembly with a polarization orthogonal to the polarization of the third optical signal;
  beam-directing means including a first wedge having a first optical axis, and a second wedge having a second optical axis that is perpendicular to the first optical axis, the beam directing means for receiving the first optical signal along the first path, and for directing the second and third optical signals outwardly therefrom with a launch angle therebetween;
  polarization rotating means for effectively rotating the polarization of the second and third optical signals by 90°; and
  a reflector for directing the second and third optical signals back through the beam-directing means;
  whereby, after passing through the beam-directing means a second time, the second and third optical signals: exit the beam-directing means along second and third paths, respectively, which are substantially parallel to the first path; pass through the birefringent assembly for a second time; and exit via the second and third ports, respectively.

Another feature of the present invention relates to an interleaver apparatus comprising:
  a first port for outputting a first polarized optical signal, which comprises a second optical signal with a first subset of channels and a third optical signal with a second subset of channels;
  a second port for inputting the second optical signal;
  a third port for inputting the third optical signal;
  a birefringent assembly optically coupled to the first, second and third ports, whereby, after the second and third optical signals make a first pass through the birefringent assembly along second and third paths, the second optical signal exits the birefringent assembly with a polarization orthogonal to the polarization of the third optical signal;
  beam-directing means including a first wedge having a first optical axis, and a second wedge having a second optical axis that is perpendicular to the first optical axis, the beam directing means for receiving the second and third optical signals along the second and third paths, respectively, for directing the second optical signal outwardly therefrom at a first angle from a first launch axis, and for directing the third optical signal outwardly therefrom at a second angle from a second launch axis, the first and second launch axes being parallel to the second and third paths;
  polarization rotating means for effectively rotating the polarization of the second and third optical signals by 90°; and
  a reflector for directing the second and third optical signals back through the beam-directing means;
  whereby, after passing through the beam-directing means a second time, the second and third optical signals: exit the beam-directing means together along a first path, which is substantially parallel to the second and third paths; pass through the birefringent assembly for a second time; and exit via the first port.

BRIEF DESCRIPTION OF THE DRAWINGS

The invention will be described in greater detail with reference to the accompanying drawings, which illustrate a preferred embodiment of the invention, and wherein:

FIGS. 6a and 6b are graphs relating the incident angle of a beam with the resultant angle of separation due to a Wollaston prism made of $YVO_4$ for different prism wedge angles;

FIGS. 7a and 7b are graphs relating the incident angle of a beam with the resultant angle of separation due to a Wollaston prism made of $TiO_2$ for different prism wedge angles.

DETAILED DESCRIPTION

Figure 4:
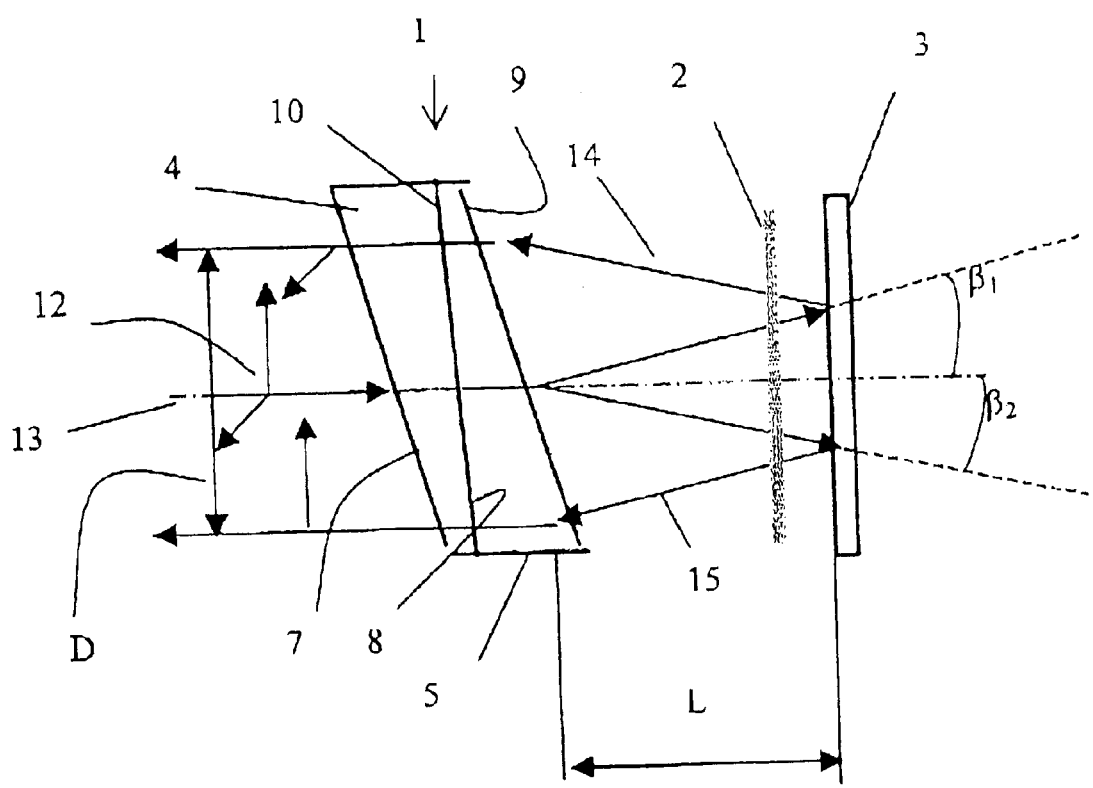
FIG. 4 is a schematic side view of the retroreflection mirror device of the present invention.

With reference to FIG. 4, the polarization retroreflection mirror according to the present invention includes a beam director 1, a quarter-wave plate 2, and a mirror 3. The beam director 1 is comprised of two birefringent wedges 4 and 5, each preferably formed of a birefringent crystal material such as Calcite ($CaCO_3$), Titanium Dioxide (Rutile or $TiO_2$) or Yttrium Vanadate ($YVO_4$), which combine to form a Wollaston-type prism.

Wedge 4 has an angled outer face 7 and a substantially vertical inner face 8. Wedge 5 has an angled outer face 9 and a substantially vertical inner face 10. The beam director can be arranged so that the angled faces 7 and 9 are adjacent forming an interface; however, it is preferable if the substantially vertical walls 8 and 10 form the interface. The angled outer faces 7 and 9 are defined by a wedge angle α.

Figure 5:
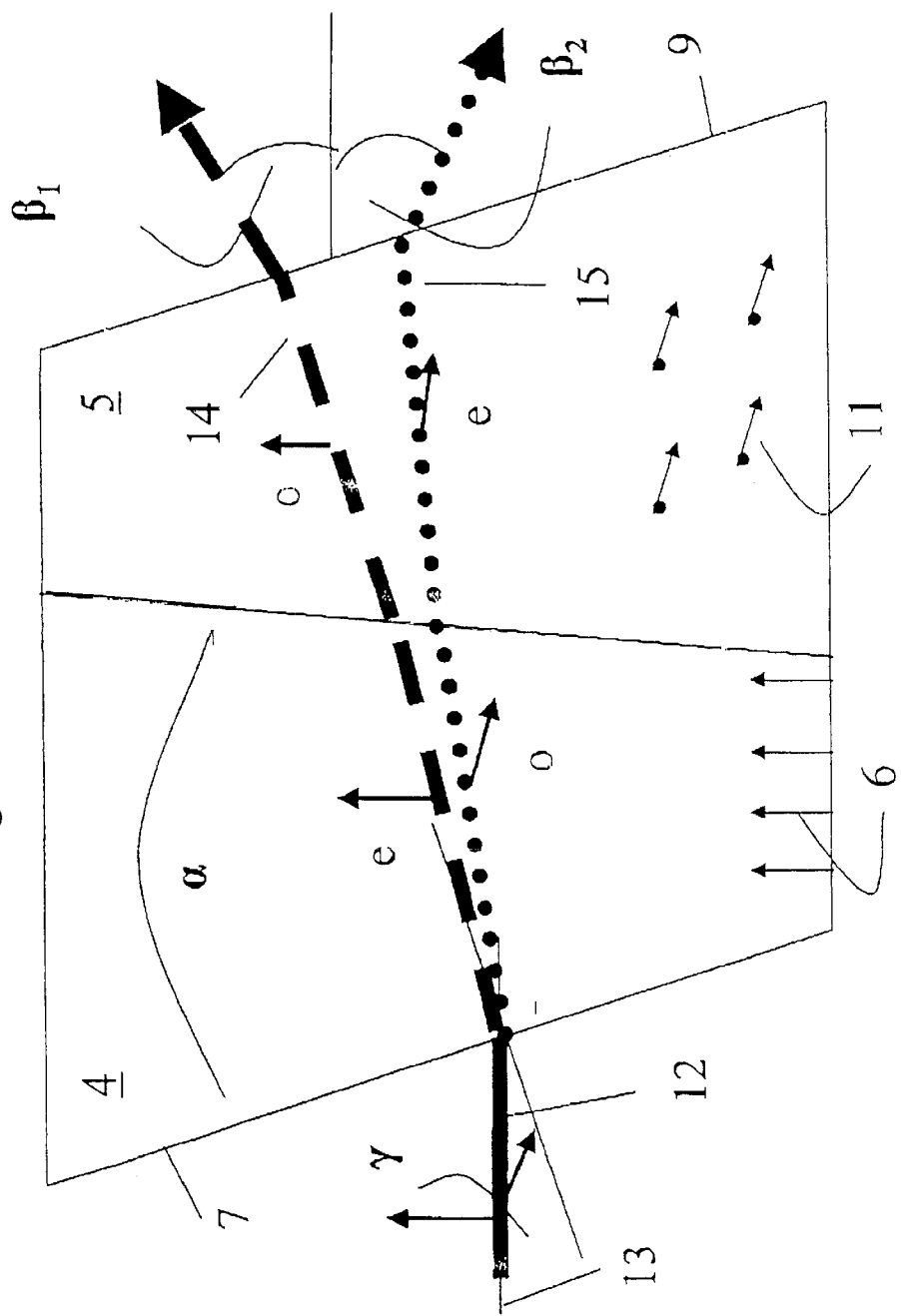
FIG. 5 is a schematic side view of a Wollaston prism.

The wedges 4 and 5 are arranged such that the optical principal axis of wedge 4, indicated by arrows 6, is orthogonal to the optical principal axis of wedge 5, indicated by arrows 11 (see FIG. 5). Accordingly, when a combined beam of light 12 is launched at an incident angle γ along an incident axis 13 through the beam director 1, a first polarized sub-beam 14 and a second orthogonally polarized sub-beam 15 get independently redirected at each interface. For example, sub-beam 14 comprised of vertically polarized light becomes the extraordinary ray in wedge 4 due to the optical axis of the wedge; however, when sub-beam 14 enters wedge 5 it becomes the ordinary ray. The opposite applies to sub-beam 15. As a result, sub-beam 14 gets directed upwardly at an angle $\beta_1$ and sub-beam 15 gets directed downwardly at an angle $\beta_2$ relative to a launch axis 16. In actuality the sub-beams 14 and 15 initially begin to be independently redirected upon entering the first wedge 4, and may have a small amount of initial separation therebetween as they exit wedge 5. However, since the crystal wedges 4 and 5 are very thin, this initial separation is very small relative to the overall separation. Therefore, for the remainder of the calculations it is assumed that the beam director 1 simply sets the angles $\beta_1$ and $\beta_2$, and that the sub-beams 14 and 15 begin diverging as they leave the second wedge 5 along the incident axis.

The quarter-wave plate 2 is positioned between the beam director 1 and the mirror 3 to intersect both of the sub-beams 14 and 15 as they pass from the beam director 1 to the mirror 3 and from the mirror 3 back to the beam director 1. The double pass through the quarter-wave plate 2 results in the polarization of both sub-beams 14 and 15 being rotated by 90° provided that the angle between the principal axes of the quarter-wave plate and the polarization of the sub-beams 14 and 15 is 45°. The quarter-wave plate 2 can be replaced with any analogous polarization rotating element or combinations of elements for interchanging the polarizations of the sub-beams 14 and 15, so that when the sub-beams 14 and 15 reenter the beam director 1 they have polarizations that are orthogonal to the polarizations that they had when they exited the beam director 1.

Assuming that the mirror 3 is a distance L from the beam director 1, the sub-beam 14 gets displaced by a distance L $tan(\beta_1)$ from the incident axis, as it hits the mirror 3. Accordingly, when the sub-beam 14 reenters the beam director 1, it has been displaced by a distance 2L $tan(\beta_1)$ from the incident axis. Similarly, sub-beam 15 is displaced by L $tan(\beta_2)$ at the mirror 3, and 2L $tan(\beta^2)$ at the beam director 1. Therefore, the overall separation D between the two sub-beams 14 and 15 becomes 2L($tan(\beta_1)+tan(\beta_2)$).

For the aforementioned crystals, $\beta_1$ and $\beta_2$ are functions of the wedge angle α, and the incident angle γ. Ideally $\beta_1$ and $\beta_2$ are equal, i.e. $\beta_1-\beta_2=0$, resulting in the sub-beams 14 and 15 exiting the beam director 1 exactly parallel. However, there are other factors that must be balanced, including having $\beta_1+\beta_2$ large enough to enable proper beam separation, while maintaining $\beta_1-\beta_2$ small enough to provide adequate parallelism of the sub-beams 14 and 15.

FIG. 6a graphically illustrates the relationship between the angle separation ($\beta_1+\beta_2$), the incident angle γ, and the wedge angle α for a $YVO_4$ crystal. FIG. 6b graphically illustrates the relationship between the angle difference ($\beta_1-\beta_2$), the incident angle γ, and the wedge angle α for a $YVO_4$ crystal. From these graphs it is obvious that the larger the wedge angle α, the larger the angle separation ($\beta_1+\beta_2$). As an example, if we assume that the wedge angle α is 12°, then from FIG. 6b we determine the incident angle γ that ensures $\beta_1-\beta_2=0$, which is 10.3°±0.4°. From FIG. 6a the angle separation ($\beta_1+\beta_2$) between the two sub-beams 14 and 15 is then determined to be about 4.9°±0.05°. If the distance L between the beam director 1 and the mirror 3 is 10 mm, the distance D between the two sub-beams will be 1.7 mm, which is large enough to accommodate beams with a diameter of 1 mm.

From these graphs 6a and 6b we are also able to ascertain how errors in the incident angle γ, the wedge angle α, and the distance L affect the angle separation ($\beta_1+\beta_2$) and the angle difference ($\beta_1-\beta_2$). Again, we will assume that the wedge angle α is 12°, which provides the largest separation D between the sub-beams 14 and 15. The incident angle γ of 10.3° has an error of ±0.4°. From FIG. 6a we can determine the error in angle separation $(\beta_1+\beta_2)$ to be ÷0.05°, and from FIG. 6b we can determine the error in angle difference $(\beta_1-\beta_2)$ to be ±0.005°.

Therefore:

$$\frac{\partial(\beta_1+\beta_2)}{\partial\gamma} \approx \frac{0.05}{0.4} = 0.125 \quad \frac{\partial(\beta_1-\beta_2)}{\partial\gamma} \approx \frac{0.005}{0.4} = 0.0125$$

Accordingly, the performance of this invention is very insensitive to the incident angle γ alignment error.

Similarly, an estimation of how much the error in the wedge angle α affects the angle separation $(\beta_1+\beta_2)$ and the angle difference $(\beta_1-\beta_2)$ can be calculated.

$$\frac{\partial(\beta_1+\beta_2)}{\partial\alpha} \approx 0.5 \quad \frac{\partial(\beta_1-\beta_2)}{\partial\alpha} \approx 0.1$$

Accordingly, the performance of this invention is much less sensitive to the component processing error than the conventional right angle prism based device.

To estimate the affect of the distance parameter L on the distance between the two sub-beams 14 and 15, the following calculation is utilized.

$$\frac{\partial D}{\partial L} = 2(\mathrm{Tan}(\beta_1)+\mathrm{Tan}(\beta_2)) \approx 4\mathrm{Tan}\frac{(\beta_1+\beta_2)}{2} = 0.17$$

Figure 1:
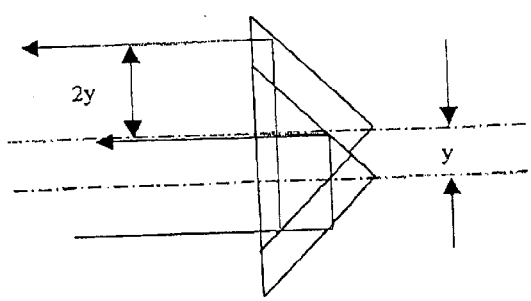
FIG. 1 is a schematic side view of a conventional right angle prism, illustrating prism-offset error.
Figure 2:
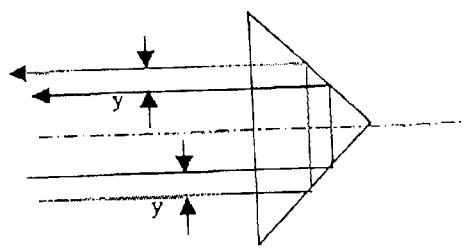
FIG. 2 is a schematic side view of a conventional right angle prism, illustrating beam-offset error.
Figure 3A:
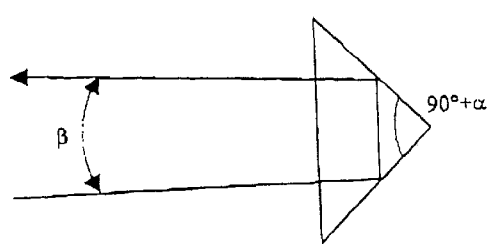
FIGS. 3a and 3b are schematic side views of conventional right angle prisms, illustrating right angle and pyramidal angle error, respectively.
Figure 3B:
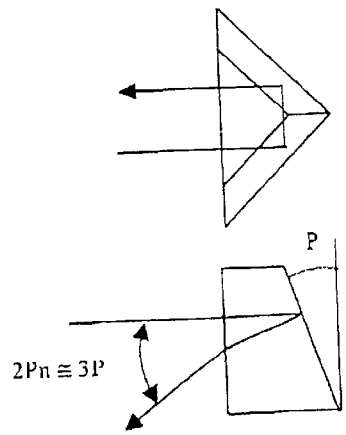

This calculation, in comparison with the error illustrated in FIG. 1, illustrates that the beam separation of this invention is more than 10 times less sensitive to assembly error than the right angle prism based device. Moreover, as compared to the performance of a right angle prism based device in FIG. 2, the performance of this invention is totally independent of the position of the incident beam.

To eliminate return loss, the incident angle γ is designed to be larger than 10° so that the normal of the mirror 3 will be tilted relative to the incident beam 12 by more than 2°.

FIGS. 7a and 7b illustrate the relationships between the angle difference $(\beta_1-\beta_2)$, the angle separation $(\beta_1+\beta_2)$, the incident angle γ, and the wedge angle α for a Rutile crystal. The birefringence of a Rutile crystal is larger than that of a $YVO_4$ crystal, therefore the beam separation $(\beta_1+\beta_2)$ and the incident angle γ should be larger than those calculated above with nearly the same tolerance.

The present invention is particularly useful when used as a polarization-dependent beam splitter or combiner for separating or combining two groups of orthogonally polarized channels, such as in the interleaver technology disclosed in U.S. patent application Ser. Nos. 09/476,034 filed Dec. 31, 1999; 09/476,609 filed Dec. 31, 1999; 09/517,640 filed Mar. 3, 2000; and 09/626,698 filed Jul. 27, 2000, which are incorporated herein by reference.

Figure 8:
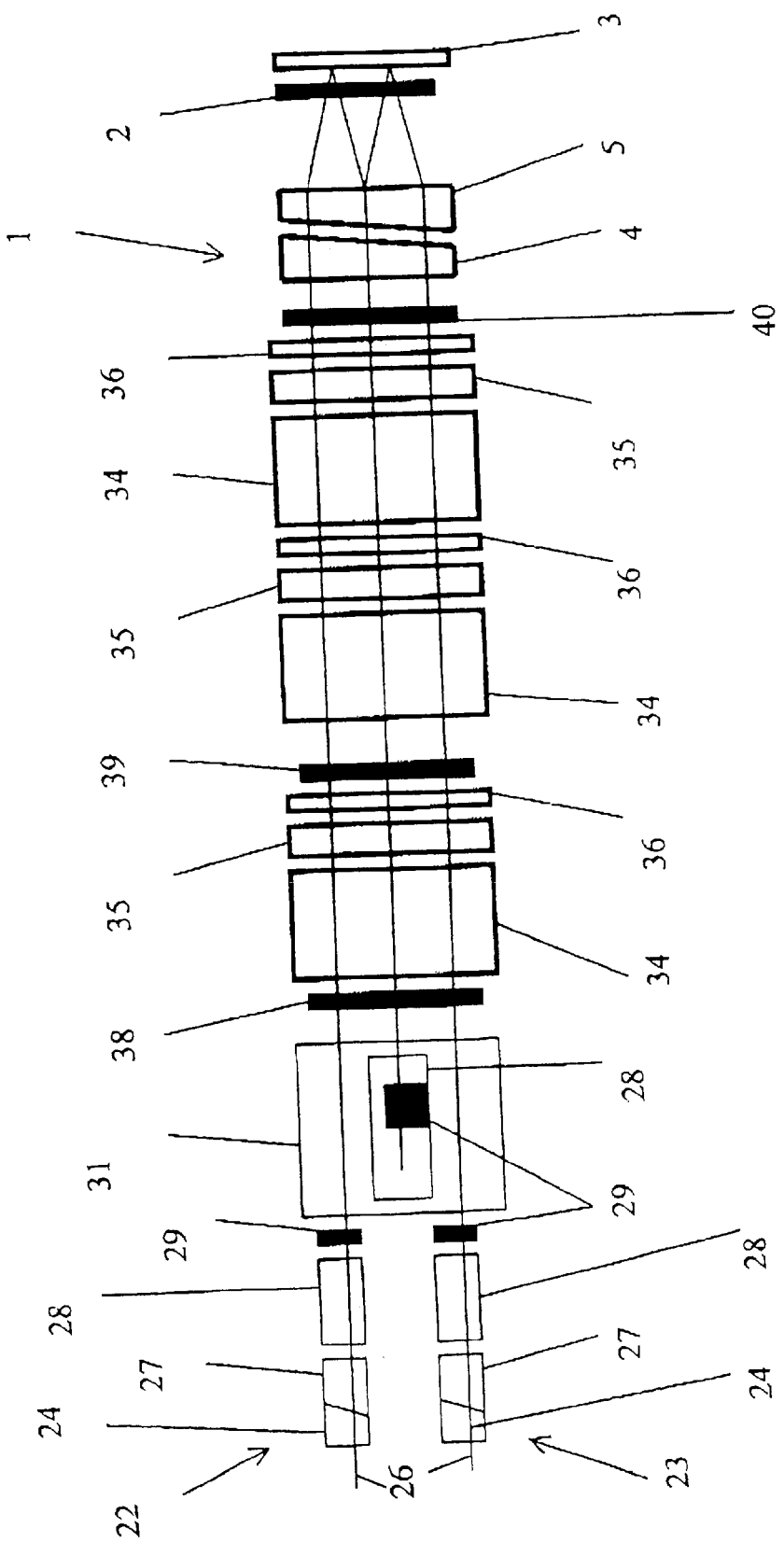
FIG. 8 is a schematic side view of an interleaver device using the retroreflection mirror device according to the present invention.
Figure 9:
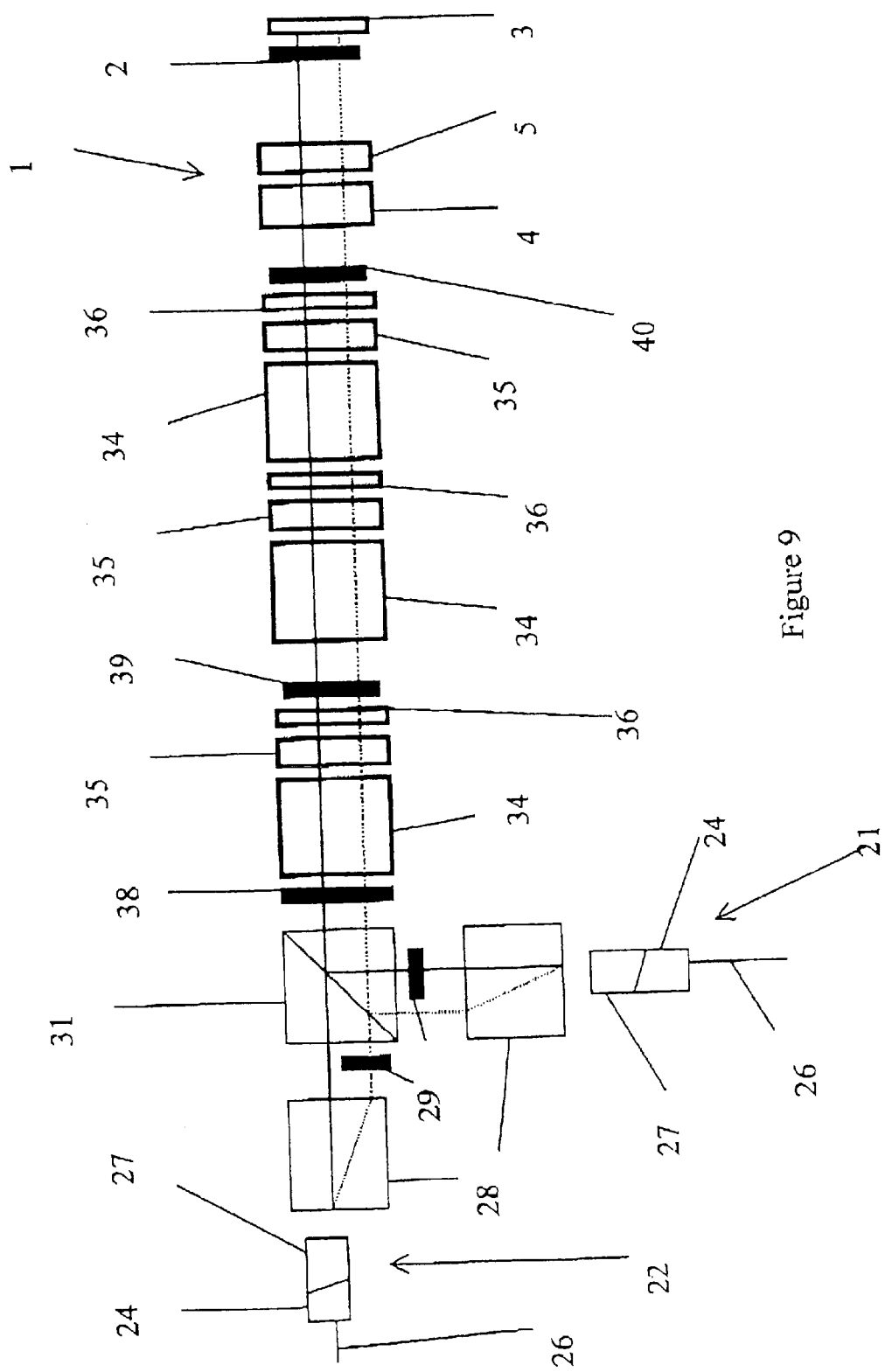
FIG. 9 is a schematic plan view of the interleaver device of FIG. 8.

With reference to FIGS. 8 and 9, the interleavers/deinterleavers disclosed in the aforementioned U.S. patent applications include a first port 21, a second port 22 and a third port 23. Port 21 is an input port for launching a beam of light into the device when used as a deinterleaver or an output port for outputting a beam of light when used as interleaver. Ports 22 and 23 are the output ports for the deinterleaver or the input ports for the deinterleaver. Ports 22 and 23 are superposed, while port 21 is positioned at right angles to and between ports 22 and 23 for reasons that will become apparent later. Each port includes a ferrule 24, containing an optical fiber 26, and a lens 27 for collimating or focusing the beam of light. Typically, each of the lenses 27 is a ¼-pitch graded index (GRIN) lens. Polarization beam splitter/combiners 28, preferably in the form of walk-off crystals, are provided at each port for splitting input beams of light into two orthogonally polarized beams or for combining two orthogonally polarized beams into a combined beam of light for output. A polarization rotator 29, preferably in the form of a half-wave plate oriented with an azimuth angle of 45°, is positioned in the path of one of the two sub-beams exiting or entering each polarization beam splitter 28 for rotating the state of polarization of the sub-beam by 90° so that both of the sub-beams have the same polarization when entering the remainder of the device or so that the sub-beams have orthogonal polarizations when entering the polarization beam splitter/combiners 28. The polarization beam splitter/combiner and the polarization rotator may not be necessary if pre-polarized light is used.

There are various means by which the sub-beams can be directed into or out of the remainder of the device, some of which are disclosed in the aforementioned U.S. patent applications. Typically, it is desirable to have all three ports arranged on one end of the device. Unfortunately, then the distance between the paths of the beams, and therefore the size of the device, is dictated by how close together the elements at the ports, i.e. the lens 27, the walk-off crystal 28 and the ferrule 24, can be arranged. There are various ways to minimize the size of the device, including using additional prisms to redirect the incoming or outgoing beams to and from the ports; however, most of these options add material and labor costs. In the illustrated and preferred embodiment, all of the sub-beams entering or exiting the device pass through polarization beam splitter (PBS) 31. The PBS 31 and the half-wave plates 29 are arranged so that light of a first polarization is passed through the PBS 31, i.e. to and from ports 22 and 23, while light having a second, orthogonal polarization is reflected at a 90° angle, i.e. to and from port 21. With this arrangement, the size of the elements at port 21 are not a factor in determining the separation between the paths traveled by the various beams and sub-beams. Therefore, the separation between the beam paths is only dependent upon the size of the elements at the ports 22 and 23 and/or the diameter of the beams. This enables the entire device to be constructed out of much less material, saving a great deal of money in material costs.

The birefringent material-based interleaver/de-interleaver illustrated in FIGS. 8 and 9 includes a birefringent assembly with a first birefringent element 32 of length L, and a second birefringent element 33 of length 2L. Preferably, the second birefringent element 33 is comprised of two parts, each one identical to the first birefringent element. To ensure better thermal stability it is preferable that the first birefringent element 32 includes two or three plates each made from a different material. In the illustrated embodiment the first birefringent element 32, and both parts of the second birefringent element 33 include an yttrium orthovanadate ($YVO_4$) plate 34, a rutile ($TiO_2$) plate 35, and a quartz crystal ($SiO_2$) plate 36. The length L is selected to obtain a desired FSR, depending on the birefringence of the various plate materials. It is necessary to orient the first and second birefringent elements 32 and 33 relative to each other and to the input and output ports 21, 22 and 23. This can be done by physically orienting the first and second birefringent elements 32 and 33 at different azimuth angles or by using wave-plates to induce the orientation change. In the illustrated embodiment, a half-wave plate 38 oriented at a 22.5° angle is positioned between the PBS 31 and the first birefringent element 32, a half-wave plate 39 oriented at a −28.5° is positioned between the first birefringent element 32 and the second birefringent element 33, and a half-wave plate 40 oriented at −6.5° is positioned between the second birefringent element 33 and the beam director 1.

Accordingly, in use as a de-interleaver, a beam of light including channels $\lambda_1$ to $\lambda_n$ is launched through port 21, collimated in lens 27, and divided into two sub-beams in walk-off crystal 28. The state of polarization of one of the two sub-beams is rotated by half-wave plate 29, whereby PBS 31 reflects both sub-beams perpendicular to their original path. After passing through the first and second birefringent elements 32 and 33 along a first path, the channels in both sub-beams have alternating polarizations. Therefore, when the sub-beams pass through the beam director 1, the odd channels $\lambda_1, \lambda_3, \lambda_5 \ldots$ get directed in one direction, while the even channels $\lambda_2, \lambda_4, \lambda_6 \ldots$ get directed in the other direction creating two pairs of sub-beams. Each of the sub-beams passes through quarter-wave plate 2, before and after being reflected back by the mirror 3 to the beam director 1, thereby rotating the state of polarization of each sub-beam by a total of 90°. Both pairs of the sub-beams then pass through the first and second birefringent elements 32 and 33 a second time along separate paths, which results in all of the sub-beams having the same polarization and in the canceling of the dispersion created during the first pass. When the sub-beams enter the PBS 31, one pair of sub-beams with one set of channels (even or odd) are passed directly there through to port 22, while the other pair of sub-beams with the other set of channels are passed to port 23. The half-wave plates 29 rotate the polarization of one of each pair of the sub-beams, which enables each pair of sub-beams to be combined in the walk-off crystals 28, focused by lenses 27 and output via fibers 26.

When used as an interleaver, the opposite occurs. The even and odd channels enter the device separately through ports 22 and 23, respectively, and travel through the first and second birefringent elements 32 and 33 separately during the first pass resulting in the odd channels exiting the second birefringent element 33 with a polarization orthogonal to the polarization on the even channels. The two signal containing the two sets of channels get directed towards each other by the beam director 1, get reflected back by the mirror 3, and have their state of polarization rotated by 90° by the quarter wave plate 2. The two signals get combined in the beam director 1, and travel back through the first and second birefringent elements 32 and 33 together for a second pass. The second pass results in all of the channels exiting with the same polarization, whereby they are all reflected by PBS 31 to be output via port 21.

Figure 10:
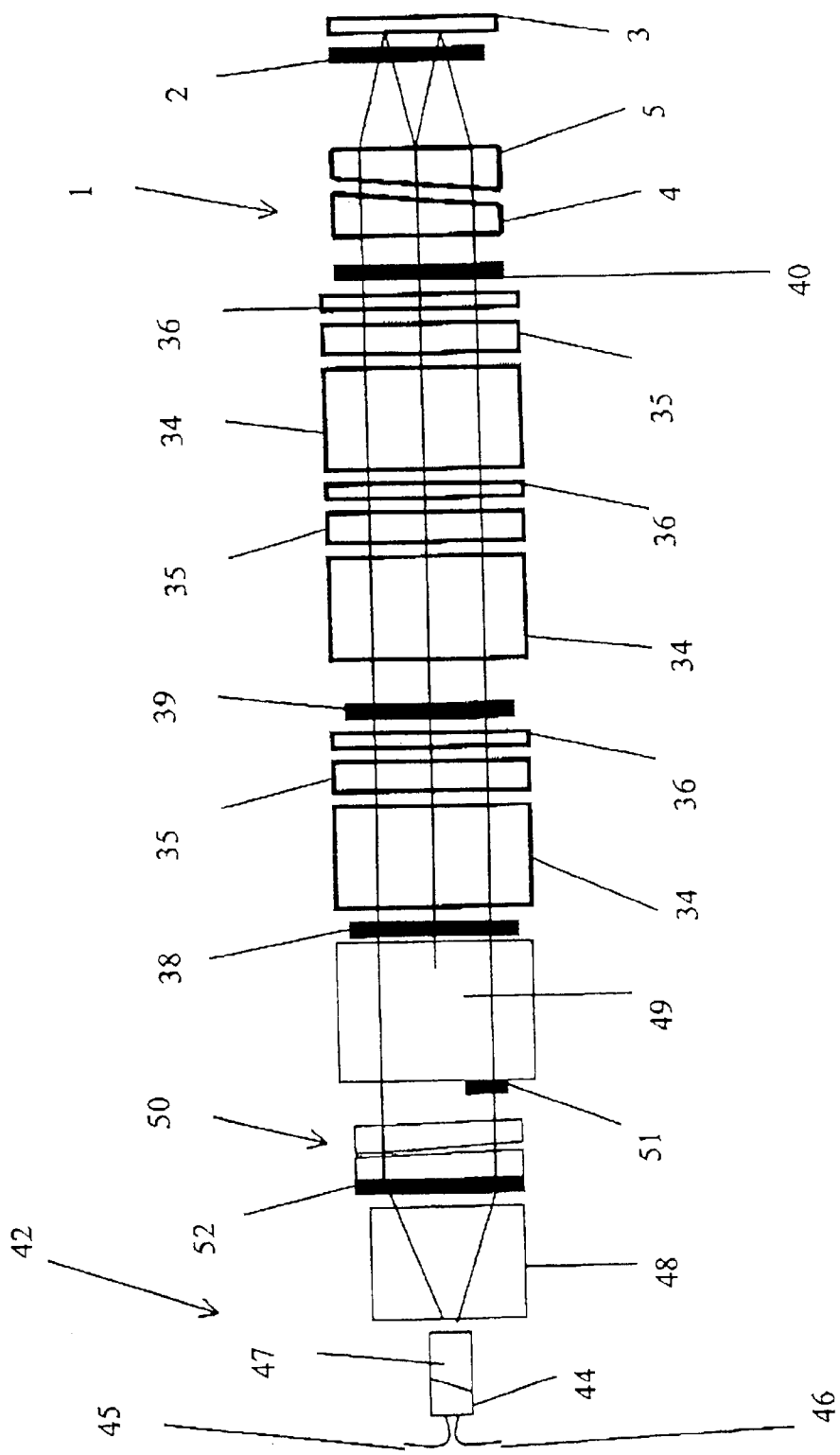
FIG. 10 is a schematic side view of another embodiment of an interleaver device using the retroreflection mirror device according to the present invention.
Figure 11:
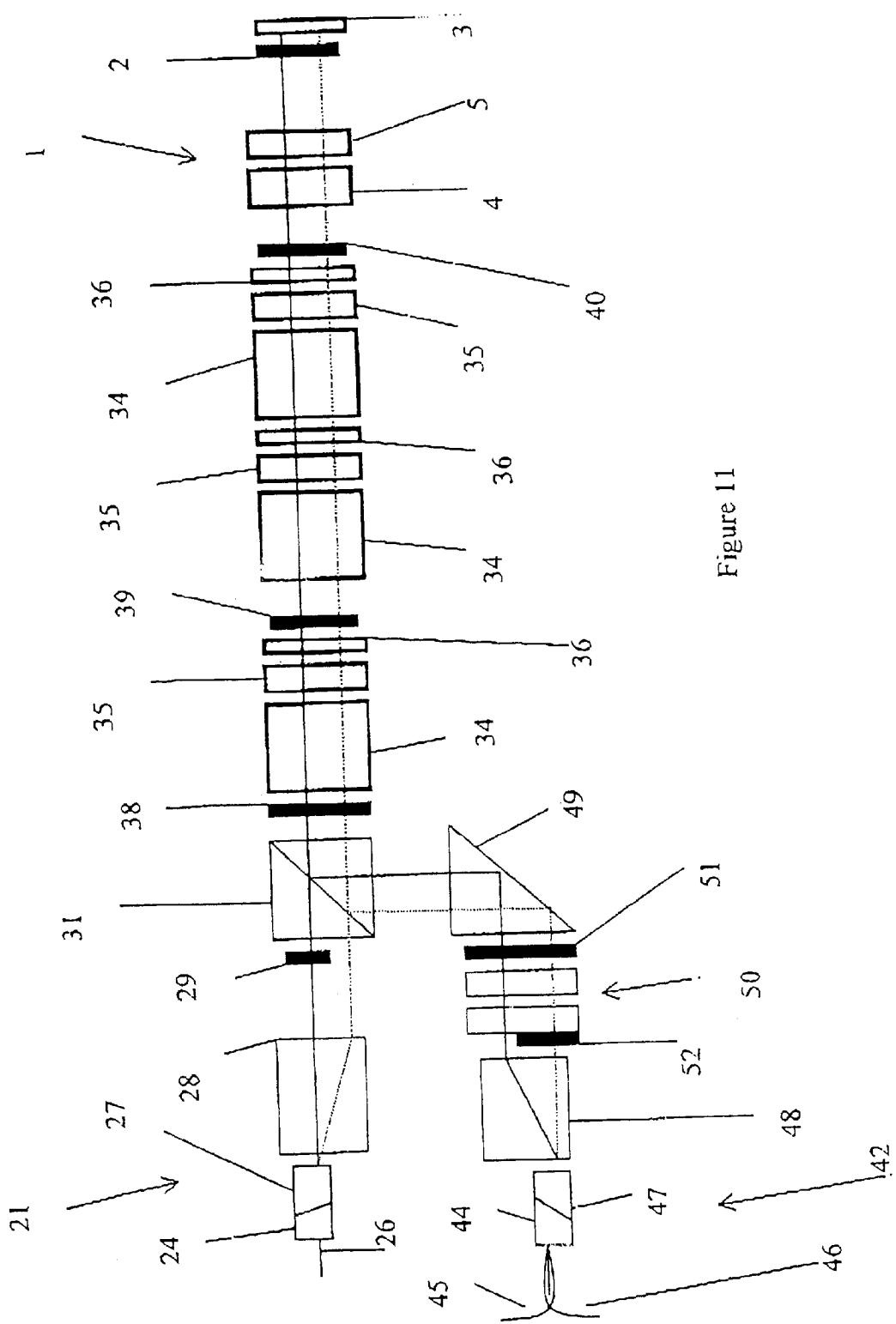
FIG. 11 is a schematic plan view of the interleaver device of FIG. 10.

Another embodiment, which completely eliminates the need to position any two ports in close proximity, is illustrated in FIGS. 10 and 11. In this embodiment port 21 is essentially the same as in FIGS. 8 and 9; however, it is positioned in axial alignment with the remainder of the device. In this embodiment the elements of ports 22 and 23 are merged into a double port 42. Double port 42 includes a dual fiber ferrule 44 containing the ends of fibers 45 and 46. A lens 47, preferably a ¼-pitch graded index (GRIN) lens, is adapted to focus outgoing beams and collimate incoming beams, as required. A polarization beam splitter/combiner, in the form of a walk-off crystal 48, is also provided for the same purpose as above. The polarization beam splitter 31 is adapted to reflect both pairs of sub-beams between the double port 42 and the remainder of the device. To enable both port 21 and double port 42 to be positioned in parallel and on one end of the device, the sub-beams are reflected again, preferably using a triangular prism 49. A Wollaston prism 50 is used to direct the sub-beams initially traveling along parallel paths towards the lens 47 along converging paths or to redirect diverging sub-beams launched from the fibers 45 and 46 so that they travel along parallel paths for input into the remainder of the device. In use as a de-interleaver, both pairs of sub-beams return from the birefringent elements 32 and 33 in the same state of polarization. Accordingly, to enable the Wollaston prism 50 to redirect all of the sub-beams to essentially the same place, a half-wave plate 51 is used to rotate the state of polarization on one pair of the sub-beams by 90°. After exiting the Wollaston prism 50 along converging paths, the state of polarization of one sub-beam in each pair of sub-beams is rotated by 90° in half-wave plate 52. This rotation enables each pair of sub-beams to be combined in the walk-off crystal 48 for output via the appropriate fiber 45 or 46.

We claim:

1. A retroreflection mirror device comprising:
   beam-directing means including a first wedge having a first optical axis, and a second wedge having a second optical axis that is perpendicular to the first optical axis, the beam directing means for receiving a first optical signal having a first polarization along a first incident axis, and for directing the first optical signal outwardly therefrom at a first angle from a first launch axis, the first launch axis being parallel to the incident axis;
   polarization rotating means for effectively rotating the polarization of the first optical signal by 90°; and
   a reflector for directing the first optical signal back through the beam-directing means;
   whereby after passing through the beam-directing means a second time the first optical signal exits the beam-directing means along a first output axis substantially parallel to the first incident axis.

2. The device according to claim 1, wherein the beam-directing means is for receiving a combined optical signal along the first incident axis, the combined optical signal comprising the first optical signal and a second optical signal, which has a second polarization orthogonal to the first polarization;
   wherein the beam-directing means is for directing the first optical signal at the first angle from the first launch axis, and for directing the second optical signal at a second angle from the first launch axis;
   wherein the polarization rotating means is for effectively rotating the polarizations of the first and second optical signals by 90°; and
   wherein the mirror is for reflecting the first and second optical signals back through the beam-directing means;
   whereby the first and second optical signals pass through the beam-directing means a second time and exit therefrom along the first output axis and a second output axis, respectively, which are substantially parallel.

3. The device according to claim 1, wherein the beam-directing means is for receiving a second optical signal along a second incident axis, the second optical signal having a second polarization orthogonal to the first polarization;
   wherein the beam-directing means is for directing the first optical signal at the first angle from the first launch axis, and for directing the second optical signal at a second angle from a second launch axis, the first and the second launch axes being substantially parallel to the first and the second incident axes;

wherein the polarization rotating means is for effectively rotating the polarizations of the first and the second sub-beams by 90°; and wherein the mirror is for reflecting the first and the second optical signals back through the beam-directing means;

whereby the first and the second optical signals pass through the beam-directing means a second time and exit therefrom together along the first output axis.

4. The device according to claim 1, wherein the first and second wedges of the beam-directing means define a Wollaston-type Prism.

5. The device according to claim 1, wherein the first and second wedges are each comprised of a birefringent crystal material selected from the group consisting of $CaCO_3$, $TiO_2$, and $YVO_4$.

6. The device according to claim 1, wherein the polarization rotating means is a quarter wave plate positioned between the beam-directing means and the reflector, whereby both the first and second sub-beams travel there through twice, providing an effective cumulative rotation of 90° to each sub-beam.

7. The device according to claim 2, wherein the second angle is substantially equal to the first angle.

8. The device according to claim 3, wherein the second angle is substantially equal to the first angle.

9. The device according to claim 7, wherein each wedge has one substantially vertical end face and one angled end face defined by a wedge angle; and wherein the substantially vertical end faces of the first and second wedges are adjacent each other.

10. The device according to claim 8, wherein the wedge angle ranges from 10° to 12°, the combined optical beam is incident upon the end face of the first wedge at an angle of 7° to 11°, and the first angle is 2° to 2.5°.

11. A deinterleaver apparatus comprising:

a first port for inputting a first polarized optical signal, which comprises a second optical signal with a first subset of channels and a third optical signal with a second subset of channels;

a second port for outputting the second optical signal;

a third port for outputting the third optical signal;

a birefringent assembly optically coupled to the first, second and third ports, whereby, after the first optical signal makes a first pass through the birefringent assembly along a first path, the second optical signal exits the birefringent assembly with a polarization orthogonal to the polarization of the third optical signal;

beam-directing means including a first wedge having a first optical axis, and a second wedge having a second optical axis that is perpendicular to the first optical axis, the beam directing means for receiving the first optical signal along the first path, and for directing the second and third optical signals outwardly therefrom with a launch angle therebetween;

polarization rotating means for effectively rotating the polarization of the second and third optical signals by 90°; and a reflector for directing the second and third optical signals back through the beam-directing means;

whereby, after passing through the beam-directing means a second time, the second and third optical signals: exit the beam-directing means along second and third paths, respectively, which are substantially parallel to the first path; pass through the birefringent assembly for a second time; and exit via the second and third ports, respectively.

12. The apparatus according to claim 11, further comprising a polarization beam splitter for directing the optical signals between the ports and the birefringent assembly, wherein the polarization beam splitter directs light of a first polarization to the first port positioned out of one side of the polarization beam splitter, and directs light of a second, orthogonal polarization to the second and third ports out of another side of the polarization beam splitter.

13. The device according to claim 11, wherein the first and second wedges of the beam-directing means define a Wollaston-type Prism.

14. The device according to claim 11, further comprising Wollaston prism means for receiving the second and third optical signals after the second pass through the birefringent assembly along the second and third paths, and for directing the second and third optical signals along converging paths to the second and third ports, respectively.

15. The apparatus according to claims 12, further comprising:

a lens at each port for collimating incoming signals or for focusing outgoing signals;

beam splitting/combining means at each port for separating incoming signals into pairs of polarized sub-beams, or for combining outgoing pairs of polarized sub-beams; and sub-beam rotating means for rotating the polarization of at least one the sub-beams in each pair of sub-beams, whereby in each pair of incoming sub-beams both sub-beams have parallel polarizations for entry into the polarization beam splitter or whereby the sub-beams in each pair of outgoing sub-beams are orthogonal for entry into the beam splitting/combining means.

16. An interleaver apparatus comprising:

a first port for outputting a first polarized optical signal, which comprises a second optical signal with a first subset of channels and a third optical signal with a second subset of channels;

a second port for inputting the second optical signal;

a third port for inputting the third optical signal;

a birefringent assembly optically coupled to the first, second and third ports, whereby, after the second and third optical signals make a first pass through the birefringent assembly along second and third paths, the second optical signal exits the birefringent assembly with a polarization orthogonal to the polarization of the third optical signal;

beam-directing means including a first wedge having a first optical axis, and a second wedge having a second optical axis that is perpendicular to the first optical axis, the beam directing means for receiving the second and third optical signals along the second and third paths, respectively, for directing the second optical signal outwardly therefrom at a first angle from a first launch axis, and for directing the third optical signal outwardly therefrom at a second angle from a second launch axis, the first and second launch axes being parallel to the second and third paths;

polarization rotating means for effectively rotating the polarization of the second and third optical signals by 90°; and a reflector for directing the second and third optical signals back through the beam-directing means;

whereby, after passing through the beam-directing means a second time, the second and third optical signals: exit the beam-directing means together along a first path, which is substantially parallel to the second and third paths; pass through the birefringent assembly for a second time; and exit via the first port.

17. The apparatus according to claim 16, further comprising a polarization beam splitter for directing the optical signals between the ports and the birefringent assembly, wherein the polarization beam splitter directs light of a first polarization to the first port positioned on one side of the polarization beam splitter, and directs light of a second, orthogonal polarization to the second and third ports positioned on another side of the polarization beam splitter.

18. The device according to claim 16, wherein the first and second wedges of the beam-directing means define a Wollaston-type Prism.

19. The device according to claim 16, further comprising Wollaston prism means for receiving the second and third optical signals from the second and third ports, respectively, along diverging paths, and for directing the second and third optical signals along the second and third paths to the birefringent assembly.

20. The apparatus according to claims 17, further comprising:

a lens at each port for collimating incoming signals or for focusing outgoing signals;

beam splitting/combining means at each port for separating incoming signals into pairs of polarized sub-beams, or for combining outgoing pairs of polarized sub-beams; and sub-beam rotating means for rotating the polarization of at least one the sub-beams in each pair of sub-beams, whereby in each pair of incoming sub-beams both sub-beams have parallel polarizations for entry into the polarization beam splitter or whereby the sub-beams in each pair of outgoing sub-beams are orthogonal for entry into the beam splitting/combining means.

\* \* \* \* \*